United States Patent [19]  
Barker et al.

[11] Patent Number: 4,701,218  
[45] Date of Patent: Oct. 20, 1987

[54] COMPOSITIONS COMPRISING INORGANIC PARTICLES

[75] Inventors: Martyn C. Barker, Henley-on-Thames; Edward G. Rowlands, Reading, both of England

[73] Assignee: Johnson Matthey Public Limited Company, London, England

[21] Appl. No.: 845,484

[22] Filed: Mar. 28, 1986

Related U.S. Application Data

[63] Continuation of Ser. No. 495,120, May 16, 1983, abandoned.

[30] Foreign Application Priority Data

May 14, 1982 [GB] United Kingdom ............ 8214174

[51] Int. Cl.$^4$ ............................................. B22F 9/18
[52] U.S. Cl. ................................. 106/114; 106/1.11; 106/1.13; 106/1.15; 106/20; 252/313.1
[58] Field of Search ............................. 106/1.11, 1.14

[56] References Cited

U.S. PATENT DOCUMENTS

| | | | |
|---|---|---|---|
| 2,438,230 | 3/1948 | Ryznar | 252/313 |
| 3,776,987 | 12/1973 | Grimes | 252/313 |
| 3,811,906 | 5/1974 | Short . | |
| 3,843,379 | 10/1974 | Daiga . | |
| 3,958,048 | 5/1976 | Donovan et al. | 427/304 |
| 4,127,422 | 11/1978 | Guzi . | |
| 4,297,397 | 10/1981 | Feldstein | 106/1.11 |
| 4,318,747 | 3/1982 | Ishijima . | |

FOREIGN PATENT DOCUMENTS

| | | |
|---|---|---|
| 0014503 | 3/1980 | European Pat. Off. . |
| 2255360 | 7/1975 | France . |
| 523736 | 7/1940 | United Kingdom . |
| 815793 | 7/1959 | United Kingdom . |
| 906854 | 9/1962 | United Kingdom . |
| 1108737 | 4/1968 | United Kingdom . |
| 1152506 | 5/1969 | United Kingdom . |
| 1154933 | 6/1969 | United Kingdom . |
| 2043092A | 10/1980 | United Kingdom . |

OTHER PUBLICATIONS

John Carbert, "Purple of Cassius", Gold–Based Enamel Colours, pub. in Gold Bulletin, vol. 13, No. 4, Oct. 1980, pp. 144–150.

C. A. Hampel & G. G. Hawley, Glossary of Chemical Terms, 2nd Ed., pub. Van Nostrand Reinhold of NY, 1982, pp. 100, 129,137,242.

Kirk–Othmer, "Encyclopedia of Chemical Technology", 3rd Ed., vol. 10, John Wiley & Sons, NY (1980), pp. 489–522.

Primary Examiner—Robert A. Wax  
Attorney, Agent, or Firm—Cushman, Darby & Cushman

[57] ABSTRACT

Floccular compositions comprising ultrafine inorganic particles having maximum particle dimensions of from 0.5 to 3000 (preferably 2 to 1500) nm combined with a size-stabilizer which is a lyophobic substance with lyophilic activity on its surface and also comprising a polyelectrolyte flocculating agent attached to the combination. The size-stabilizer protects the ultrafine particles against agglomeration during formation of the flocculates and the mixing of flocculates into various materials such as plastics, inks, paint or refractory materials. Also a method for making the flocculates from colloidal dispersions of particles, size-stabilizers and flocculating agents. The flocculates are particularly useful with particles of metals of the coinage and transition groups for making transparent coloring agents. Also materials containing the ultrafine particles.

24 Claims, 3 Drawing Figures

COMPOSITIONS COMPRISING INORGANIC PARTICLES

This is a continuation of application Ser. No. 495,120, filed May 16, 1983, which was abandoned upon the filing hereof.

This invention relates to floccular compositions comprising ultrafine inorganic particles (especially particles of coinage or transition metals) in which the maximum dimension of a major proportion of the particles is from 0.5 to 3000 nm. It also relates to a method for making the compositions and to materials containing the particles.

Ultrafine inorganic particles are conveniently prepared as dilute dispersions in liquids but more concentrated dispersions or preferably dry particles are needed if the particles are to be easily mixed into widely used materials such as inks, paints, refractory enamels or highly viscous molten plastics. Attempts to make concentrates or to dry ultrafine particles by the removal of liquid have resulted in unacceptable agglomeration even when the ultrafine particles have been treated with protective colloids before removal of the liquid.

Agglomeration destroys valuable properties of ultrafine inorganic particles. For example certain metal particles having a maximum particle dimension of from 2 (or preferably from 7) to 45 nm have a potential usefulness as so-called "transparent" colouring agents. ("Transparent" colouring agents generate colour by absorbing certain wavelengths of light as it is transmitted through the colouring agent whereas most inorganic pigments generate colour by a combination of light scattering and light absorbing actions). The ability to act as a transparent colouring agent is lost if coinage or transition metal particles agglomerate to sizes above 45 nm for then colour generated by scattering becomes dominant. Worthwhile transparent colouring ability is also lost if the particle size is below 2 nm and it declines as the particle size falls from 7 to 2 nm.

The problem of agglomeration has impeded the development of ultrafine particles of gold and silver as transparent colouring agents. For example, Purple of Cassius is a commercially available 'transparent' inorganic colouring agent in which fine gold particles exist attached to particles of stannic oxide dispersed in water. The stannic oxide effectively inhibits agglomeration in dilute dispersions but attempts to remove water cause agglomeration and a consequent masking of any colour generated by absorbtion.

One object of this invention is to reduce the problem of agglomeration associated with compositions comprising ultrafine inorganic particles, especially metal particles. Other objects include the provision of a simple method for obtaining the compositions from dispersions and the provision of materials containing the ultrafine particles.

Accordingly this invention provides a floccular composition comprising (a) ultrafine inorganic particles in which the maximum dimension of a major proportion of the particles is from 0.5 to 3000 nm (preferably 4 to 1500 nm), (b) a size-stabilizer in combination with the particles, the size-stabiliser being a lyophobic substance provided with means which impart lyophilic activity to the surface of the substance wherein the substance is lyophobic to at least one liquid dispersant to which the means is lyophilic and wherein the lyophobic substance is sufficiently impermeable to said liquid dispersant to prevent a reduction of more than 5% in the volume of the substance on drying of the substance after its removal from a dispersion of the substance in said liquid dispersant and (c) a flocculation modifier which comprises a polyelectrolyte having a molecular weight of preferably at least 3000 and which is attached to the size-stabiliser in combination with the ultrafine particles.

The presence of such a compound lyophobic/lyophilic size-stabiliser in the floccular composition confers on the composition a good resistance to agglomeration of the ultrafine particles both during the formation of the composition and during its mixing into widely used materials especially viscous molten plastics materials which are notorious for causing agglomeration.

This invention also provides a method for making a floccular composition comprising ultrafine inorganic particles in which the maximum dimension of a major proportion of the particles is from 0.5 to 3000 nm (preferably 4 to 1500 nm) wherein the method comprises (a) adding a colloidal dispersion of ultrafine particles to a dispersion of a size-stabiliser in liquid dispersant whereupon the ultrafine particles and the size-stabiliser spontaneously enter into a combination, the size-stabiliser being a lyophobic substance provided with means which impart lyophilic activity to the surface of the substance, the substance and the means being respectively lyophobic and lyophilic towards the liquid dispersant and wherein the lyophobic substance is sufficiently impermeable to the liquid dispersant to prevent a reduction of more than 5% in the volume of the substance on drying of the substance after its removal from the liquid dispersant, (b) either, before the addition of the colloidal dispersion of ultrafine particles to the dispersion of size-stabiliser, treating the size-stabiliser with a dispersion of a flocculation modifier which comprises a polyelectrolyte having a molecular weight of preferably at least 3000 and which as a result of the addition of the colloidal dispersion flocculates with the size-stabiliser and ultrafine particles producing a floccular composition comprising flocculation modifier and size-stabiliser in combination with ultrafine particles or, after the addition of the colloidal dispersion of ultrafine particles to the dispersion of size-stabiliser, treating the size-stabiliser with a dispersion of a flocculation modifier which comprises a polyelectrolyte having a molecular weight of preferably at least 3000 and which flocculates with the size-stabiliser and the ultrafine particles producing a floccular composition comprising flocculation modifier and size-stabiliser in combination with ultrafine particles and optionally (c) separating off dispersant from the floccular composition whereby there is obtained a dry floccular composition which is free flowing and in which flocculation modifier is attached to size-stabiliser in combination with the ultrafine particles.

The method ensures than when flocculation occurs and liquid dispersant is separated from the floccular composition, the majority of ultrafine particles remain sufficiently spaced apart to resist agglomeration. In addition after the dispersant has been separated off (for example by filtration, spray drying or heating with continuous agitation) it is possible to obtain dry floccular compositions which are not only resistant to agglomeration of the ultrafine particles but which also flow freely.

Preferably the size-stabiliser is a hydrophobic substance provided with means for imparting hydrophilic activity to its surface so enabling the method for making the floccular composition to employ water as a dispersant. Size-stabilisers may be organic or inorganic. Typical organic size-stabilisers include macromolecular (for example having molecular weights of at least 5,000) substances such as modified polystyrene, modified aliphatic polyolefins, copolymers of vinyl acetate and ethylene, polyacrylates or polymethacrylate, polyvinyl acetate, polyurethanes PTFE). In the case of the polystyrene or aliphatic polyolefins, the hydrocarbon chains provide a hydrophobic core and the surface of the core is modified by the provision of surface hydrophilic groups for example carboxylic groups, hydroxyl or sulphate groups. Such groups may be provided by grafting unsaturated acids or anhydrides onto the core, by polymerising styrene, olefins or tetrafluoroethylene in the presence of surfactants containing the hydrophilic groups or sometimes by the presence of residues from free radical polymerisation initiators. Suitable unsaturated acids include acrylic or methacrylic acids and a suitable anhydride is maleic anhydride. Suitable surfactants include non-ionics such as polyvinyl alcohol, anionics such as benzene sulphonates or metal carboxylates such as potassium oleate or cationics such as cetyl trimethyl ammonium chloride. In the case of size-stabilisers containing polar groups, it is the presence of polar groups on the surface of the size-stabiliser which confer hydrophilic activity on an otherwise substantially impermeable hydrophobic core. The glass transition temperature or (in the case of crystalline polymers) the crystalline melting point of the size-stabiliser is preferably not less than 60° C. so that if required the floccular composition can be easily ground to a fine powder without resorting to freeze grinding.

Typical inorganic size-stabilisers include barium sulphate, calcium carbonate, alumina or silica, titania, ceria, cadmium sulphide or ferric oxide. These compounds are all substantially insoluble in water and are therefore essentially hydrophobic. However the ionic nature of the compounds leaves a net charge at their surfaces which is sufficient to impart hydrophilic activity. If necessary surface charges can be reversed by treating negatively charged surfaces with a cationic coating material or by treating positively charged surfaces with an anionic coating material. Silica and alumina have the advantage of being very heat resistant and so can be mixed into hot molten plastics materials or refractory materials without risk of decomposition. Cadmium sulphide and ferric oxide illustrate the possible use of coloured size stabilisers. Preferably the density of the size-stabilisers does not exceed 5.0 g/cm$^3$.

The size-stabilisers are used in the form of (preferably colloidal) dispersions of particles in liquid dispersants. For this reason the maximum dimension of a particle of size-stabiliser should not exceed 10 μm. However the smaller the particles, the easier it is to achieve high concentrations of ultrafine particles in the floccular composition. On the other hand if the particles are too small, flocculation becomes difficult. Preferably the number average maximum dimensions of the particles of size-stabiliser lie in the range 20 nm to 5 $\mu$m. Inorganic size-stabilisers have the advantage of easy availability in the small size ranges and silica is especially valuable in this respect. Concentrations of ultrafine particles in the floccular composition can be as high as 60% by weight with the lower limit being determined solely by commercial factors and commercial practice will probably dictate a minimum of not less than 0.001% by weight.

The mechanism by which the size-stabiliser is combined with the ultrafine particles when dry is not fully understood. It may be physical or chemical. It may involve the flocculation modifier. Presumably hydrogen bonding, ionic attraction and van der Waals forces are possible explanations at least in part and probably at least two of these mechanisms will co-exist to form some type of stable equilibrium. Whether or not a potential size-stabiliser has means for combining is quickly determinable by trial and error. Similar considerations apply to attempts to explain and determine the attachability of a flocculation modifier to the combination.

The flocculation modifier may be any macromolecular polyelectrolyte capable of attaching itself to the size-stabiliser or to a combination of size-stabiliser and ultrafine particles so as to result in a flocculation (optionally after any necessary adjustment of pH) to produce a floccular composition comprising size-stabiliser in combination with ultrafine particles and attached flocculation modifier. Preferably the flocculation modifier attaches at a plurality of sites. Most simply, the flocculation modifier chosen may comprise a high molecular weight of polyelectrolyte a flocculating agent having a molecular weight of preferably at least 10,000 which produces an immediate spontaneous flocculation of the combination of size-stabiliser and ultrafine particles. Alternatively if it is preferred to control the onset of flocculation, it is possible to choose a flocculation modifier which only results in flocculation at a predetermined pH so that flocculation will not occur until the pH of the dispersion is adjusted to the pre-determined pH. A less simple technique may be necessary where the size-stabiliser has a high density (for example over 3.5 g/cm$^3$) especially if it comprises particles having largest dimensions of the order of 20 nm to 400 nm. The density of such size-stabilisers causes them to settle even though they otherwise have the properties required for colloidal dispersion. Accordingly it is desirable to add to them a polyelectrolyte flocculation modifier which first assists in suspending the dense particles until addition of the colloidal dispersion of ultrafine particles and then results in flocculation of a composition comprising size-stabiliser in combination with ultrafine particles and flocculation modifier. Preferred flocculating modifiers have molecular weights of from $10^4$ to $10^7$. The flocculating modifier may be a cationic polyelectrolyte such as a polyacrylamide or a polyamine or an anionic polyelectrolyte such as a salt of a polyacrylate. Preferably the flocculating modifier is used in the form of a solution.

A variety of conventional agitation techniques exist for making colloidal dispersions of ultrafine inorganic materials. For example they may be made by ultra-sonic vibrations or rapid stirring. Preferably the dispersions are made by liberating a metal from a solution of one or more of its compounds because liberation techniques give particle-size distributions which are narrower and are often monodisperse. For example usually less than 1% of the particles have maximum dimensions which differ from the number average maximum dimension by more than 40 nm. Often over 50% by number have maximum dimensions which differ by less than 10 nm from the number average maximum of all the particles. Such narrow monodisperse distributions are largely preserved by the method for making floccular compositions so that where the ultrafine particles are transparent colouring agents, it is possible to obtain colouring compositions which generate purer colours, that is to say colours characterised by the presence of a narrow maximum peak in the transmission spectrum.

It has been found to be worthwhile to treat the colloidal dispersion of ultrafine particles with a sterically hindering protective colloid. Such protective colloids are substances which can attach to a colloidal particle and which are caused to swell considerably by the liquid dispersant. Swelling occurs to such an extent that a barrier of immobilised liquid and protective colloid is formed around the ultrafine particles. The protective colloid serves to lessen the adverse consequences of accidental additions of electrolyte to the colloidal dispersion. During drying the volunme of the protective colloid reduces by far more than 5%. It should be noted that attachment of the size-stabiliser to the ultrafine particles may be direct or via an intervening protective colloid.

This invention especially provides a floccular composition in which the ultrafine particles are particles of one or more coinage metals or transition metals in which the majority (preferably at least 70%) of the particles have a maximum particle dimension of from 2 or 4 to 45 nm. Preferred metals are gold, silver or copper for these can be used as transparent colouring agents imparting colours ranging from red, through yellow and green to maroon. The particular colours obtained can be adjusted to some extent by varying the size of the particles. Unlike organic transparent colouring agents, gold and silver particles are extremely resistant to heat and gold is extremely resistant to light. Preferably the majority of gold particles should have maximum dimensions of from 7 or 12 to 45 nm (or 50 nm if a small amount of scattering is tolerable), whereas the majority of silver particles should preferably have maximum dimensions of from 3 to 25 nm. It has also been discovered that the floccular compositions enhance the resistance of ultrafine copper or cobalt to heat and that if the floccular compositions are thermoformed into films, then it is possible to obtain stable transparent colouring composition. However the stable colour produced by the compositions obtained from copper particles may be due to transparent ultrafine particles of a copper compound. The films may be ground to powders without loss of colour stability.

Because of lack of stability in air and water, it is preferred not to use ultrafine particles composed of metals more electropositive than cobalt unless the particles form tenacious protective layers of for example oxides. The platinum group metals, especially platinum, palladium, rhodium and ruthenium provide additional examples of non-coinage metals which are useful. It has also been discovered that the invention is suitable for use with ultrafine particles comprising compounds of metals, especially oxides and in particular with metal oxides which are "transparent" colouring agents, for example red iron oxide. In the case of the oxides, the maximum particles dimensions can be much greater than 50 nm before scattering becomes an intolerable problem. For example sizes up to 150 nm are practicable. Other useful ultrafine particles may for example comprise pigments such as red cadmium sulpho selenide, yellow nickel titanate and blue cobalt aluminate.

This invention also provides a material containing ultrafine inorganic particles of the types hereinbefore described. In the case of finished plastics materials ready for moulding or extrusion, ink or paint compositions ready for use or refractory enamels prior to firing, the material or composition will usually contain from 0.01 to 5% (by weight of the material in the absence of the floccular composition) of the ultrafine particles. Masterbatches for use in making finished materials may contain from 1 to 50% (preferably 5 to 30%) by weight of the ultrafine particles. The particles may be incorporated into materials by mixing the floccular compositions of this invention with the material or using most known mixing techniques. For example for plastics materials it is possible to use solvent techniques or melt-mixing in an internal mixer (such as Banbury or a two roll mill) or high speed fluidising mixing (using for example Henschel or Diosna mixers). Ink and enamel formulations may be made by bead or ball milling. For paints, the floccular compositions may be simply stirred into a paint base. Accordingly the materials will also contain some size-stabiliser and flocculating agent in addition to the ultrafine particles.

The invention is illustrated by reference to the drawings of which

The invention is also illustrated by the following Examples in which the references to water are references to distilled water.

EXAMPLES 1 AND 2

Aqueous colloidal dispersions of gold were prepared by liberating gold by reducing an aqueous solution of chloroauric acid as follows:

0.1 g of chloroauric acid containing 49.2% weight of gold was dissolved in 1 liter of distilled water and the solution was divided into two equal portions. One portion was for use in Example 1 and the other was for use in Example 2. Both portions were heated to boiling with continuous stirring and then into each was quickly injected a 1% (by weight) an aqueous reducing solution of trisodium citrate in cold distilled water. The volumes of citrate solution injected are shown in Table A. A colloidal dispersion of transparent ultrafine particles of gold was formed to which was added 1.25 mls of a 1% (by weight) solution of gum arabic as a protective colloid. The dispersion of gold particles protected by gum arabic had a dominant colour generated by the absorption of light by the gold particles.

Figure 1:
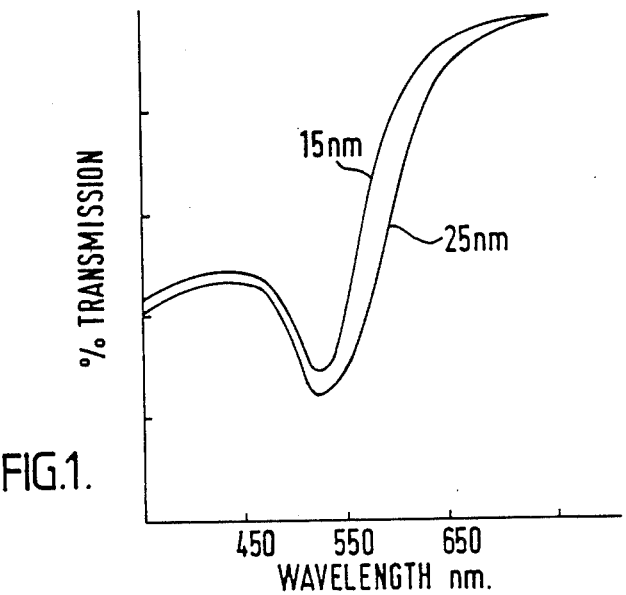
FIG. 1 shows the transmission spectra of colloidal dispersions small (15 nm) and large (25 nm) particles of gold.

The number average maximum dimension (as estimated by electron microscopy) of each of the two families of metal particles is shown in Table A as is the colour dominant to the unaided eye. The transmission spectra of the two colloidal dispersions are shown in FIG. 1. It will be seen from Table 1 that the dimensions of the particles can be varied by varying the ratio of citrate to chloroauric acid. The lower the proportion of citrate used, the coarser will be the particles and hence varying the citrate/acid ratio offers an easy way of shifting the dominant colour from orange towards purple. It will be seen from FIG. 1 that pure colours are obtained, that is to say the dominant transmission occurs over a band of wavelengths less than 60 nm wide in the case of Example 1 or less than 100 nm in the case of Example 2.

TABLE A

| Example | Volume of Citrate injected: ml | Average Max. Dimensions of Particles nm | Dominant Colour |
|---------|-------------------------------|----------------------------------------|-----------------|
| 1 | 20 | 15 | Orange |
| 2 | 8 | 25 | Magenta |

EXAMPLE 3

Finer particles of gold could be produced by using sodium borohydride as follows.

1 ml of a $2.5 \times 10^{-3}$ mol/dm$^3$ aqueous solution of potassium chloroaurate was mixed vigorously with 3 mls of a $10^{-3}$ mol/dm$^3$ solution of ice cold aqueous sodium borohydride. A colloidal dispersion of ultrafine metallic particles of gold formed and the dispersion had a dominant purple colour corresponding to an extinction maximum at 525 nm. The gold particles had maximum dimensions in the range 3 to 25 nm.

EXAMPLE 4

Figure 2:
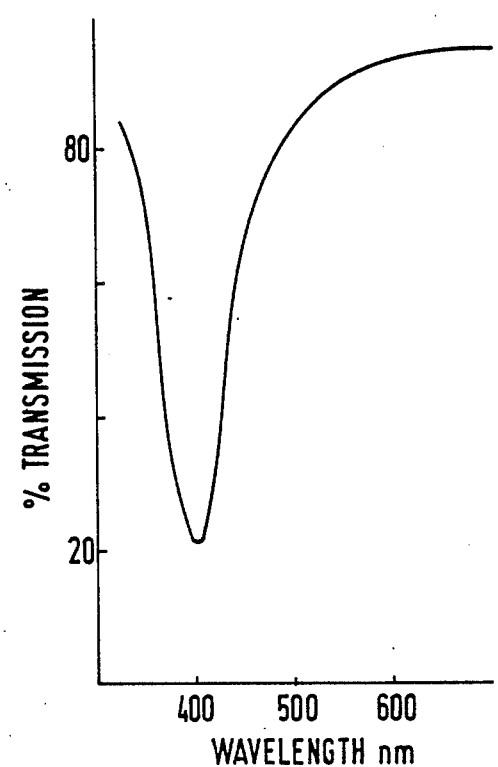

An aqueous colloidal dispersion of silver was prepared from silver nitrate as follows:

An ice-cold 0.02M solution of sodium borohydride in water was added with vigorous stirring to a $5.2 \times 10^{-3}$M solution of silver nitrate in distilled water. A ratio of 10 volumes of borohydride solution to one of nitrate was used. Reduction was spontaneous producing a deep yellow colloidal dispersion of transparent ultrafine metallic silver particles. 25 mg/l of polyvinyl pyrrolidone was added to the dispersion as a protective colloid so as to produce ultrafine particles protected by polyvinyl pyrrolidone. The silver particles had maximum dimensions in the range of from 4 to 25 nm and it was estimated that their number average maximum dimension lay in the range 10 to 12 nm. FIG. 2 shows the transmission spectrum for a deep yellow colloidal dispersion of silver.

EXAMPLE 5

The procedure of Example 4 was repeated except that the solution of silver nitrate was mixed with 5 mls of a 1 wt % solution of ethylene diamine tetracetic acid in water and the ratio of borohydride solution to nitrate was reduced to 3:1. Silver particles were obtained which had maximum dimensions down to 2 nm.

EXAMPLE 6

Figure 3:
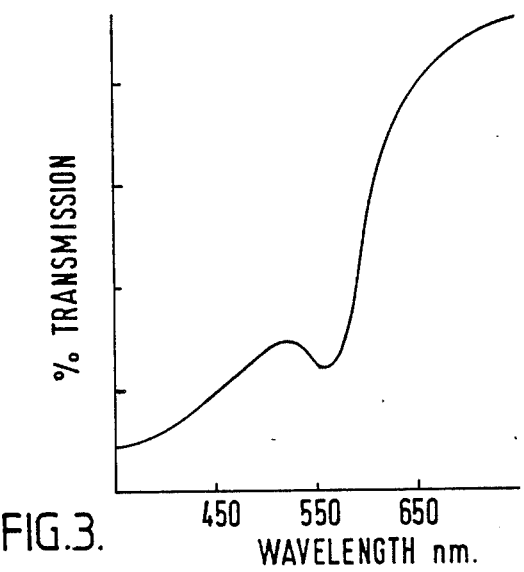
FIG. 2 shows the transmission spectrum of a colloidal dispersion of silver particles and FIG. 3 shows the transmission spectrum of a colloidal dispersion of copper particles.

An aqueous colloidal dispersion of copper was prepared by liberating copper by reducing an aqueous complex of copper and polyacrylate as follows:

20 mls of a 0.3M solution of cupric chloride in distilled water was mixed with 25 mls of an 8% (by weight) aqueous solution of the sodium salt of polyacrylic acid whereupon it is presumed that a complex of copper and polyacrylate is formed. The mixture was diluted 100 fold and a 100 mls of the diluted mixture was heated to between 80° C. and 100° C. and then 3 mls of a 1.25M solution of hydrazine hydrate was added. Reduction of the presumed complex of copper occurred producing a red colloidal dispersion of transparent ultrafine copper particles. 25 mg/l of gelatin was added to the colloidal dispersion as a protective colloid. FIG. 3 shows the transmission spectrum of the colloidal dispersion of copper from which it will be seen that a small dominant colour component occurs at about 560 to 575 nm giving a rich red colour.

EXAMPLE 7

An aqueous colloidal dispersion of cobalt was prepared by the procedure of Example 6 modified by the substitution of cobaltous chloride for cupric chloride and by the substitution of 0.02M sodium borohydride as the reducing agent instead of hydrazine. Reduction produced a black colloidal dispersion of ultrafine cobalt particles which were transparent to the extent that particles were not sufficiently thick for their blackness to absorb all the light beamed to pass through them. The cobalt particles are unstable in air for more than a few minutes and so it is necessary that they be promptly converted to a floccular composition and dispersed in a protective material such as a plastics material.

EXAMPLE 8

An aqueous colloidal dispersion of red iron oxide was made by adding iron oxide to water and subjecting the water to ultrasonic vibrations for about 15 minutes. A rusty red colloidal dispersion of ultrafine particles of iron oxide was obtained.

EXAMPLES 9 TO 11

Aqueous colloidal dispersions of three pigments, namely red cadmium sulpho-selenide (Example 9) yellow nickel titanate (Example 10) and blue cobalt aluminate (Example 11) were made as follows:

25 g of the pigment was added to 250 mls of distilled water and subjected to ultrasonic vibration for 15 minutes which produced a dispersion of the pigment in the water. The dispersion was then subjected to the action of a colloid mill until the dispersion became colloidal. The size of the particles in the colloidal dispersion was estimated to be 1000 nm.

EXAMPLES 12 TO 18

Colloidal dispersions made according to Examples 1, 2 or 4 were converted to floccular compositions using a size-stabiliser and a flocculation modifier.

The size-stabiliser used in Examples 12 to 18 was a proprietary modified hydrophobic polystyrene supplied by Vinyl Products Limited as an aqueous latex of globules dispersed in water. The globules had average maximum size of about 1 μm. The polystyrene had a glass transition temperature of 70° C. and was modified by the presence of entities believed to be carboxyl groups which provide hydrophilic activity. The various concentrations of globules in the latex and the volumes of latex used are shown in Table B. The size-stabiliser used in Examples 17 and 18 was an aqueous dispersion of silica. Again the concentration of silica particles in the water and the volume of silica dispersion used is shown in Table B.

The flocculation modifier chosen was a proprietary cationic macromolecular polyamine or macromolecular polyquaternary amine supplied by Cyanamid under the names 'Superfloc' 587 and 'Superfloc' 521 respectively. The flocculation agent is supplied as a solution containing approximately 25% by weight of the agent.

Various volumes of size-stabiliser latex or dispersion were added to 720 mls of each of the colloidal dispersions made according to Examples 1, 2 or 4. Then distilled water was added followed by various volumes of the solution of flocculation

TABLE B

| Example | Source of Colloidal Dispersion | Volume of size-stabiliser latex or dispersion added mls | Concentration of size-stabiliser in latex or dispersion % by wt | Volume of distilled water added mls | Volume of *Flocculating solution added mls | Concentration of ultrafine particles in precipitate % by wt | Colour of Precipitate |
| --- | --- | --- | --- | --- | --- | --- | --- |
| 12 | Eg 1:Gold at 15 nm | 180 | 2 | 50 | 18 of 587 | 1 | Orange |
| 13 | Eg 2:Gold at 25 nm | 180 | 2 | 50 | 18 of 587 | 1 | Red |
| 14 | Eg 1:Gold at 15 nm | 9 | 1.25 | 100 | 4.3 of 521 | 16.7 | Orange |
| 15 | Eg 2:Gold at 25 nm | 9 | 1.25 | 100 | 4.3 of 521 | 16.7 | Red |
| 16 | Eg 3:Silver at 10 to 12 nm | 180 | 2 | 100 | 21 of 587 | 1 | Yellow |
| 17 | Eg 1:Gold at 15 nm | 72 | 4 | 144 | 7.2 of 587 | 1.2 | Orange |
| 18 | Eg 2:Gold at 25 nm | 72 | 4 | 144 | 7.2 of 587 | 1.2 | Red |

*The flocculating modifiers were 'Superfloc' 587 or 'Superfloc' 521 modifier which spontaneously attached to the combination resulting in flocculation and precipitation of a floccular composition. The precipitate was dried and found to contain ultrafine particles attached (possibly via the protective colloid) to the size-stabiliser. The colour of the precipitate and the concentration of ultrafine particles it contained are shown in Table B.

The precipitates were dried by heating in air at 90° C. In the case of precipitates containing polystyrene, the heated precipitates reached a temperature above the glass transition temperature of the polystyrene and so they could be formed into a film by pressing between opposed parallel glass plates. Films 90 μm thick were made in this way. No more than a slight shift towards the blue of the dominant colour occurred as a result of the film-forming operation. This indicates that the floccular compositions have a very high resistance to agglomeration of the ultrafine particles.

For precipitates containing silica, a brittle film could be formed by drying the precipitate on a glass plate at 90° C. Again the film-forming operation caused only a small shift of the dominant colour towards the blue.

EXAMPLE 19

The procedures of Examples 12 to 18 were repeated using colloidal dispersions of ultrafine particles which differed only in that they carried no protective colloids. In all cases, as compared with the protected systems no colour shift occurred which was discernable by the unaided eye although a slight shift towards the blue of the dominant colour of the precipitate could be detected by instruments. Accordingly the benefit gained by using a protective colloid lies mainly in the increased resistance of the colloid dispersion of ultrafine particles to accidental contamination by electrolyte.

EXAMPLE 20

A floccular composition comprising gold and a conventional water-dispersible polyacrylate acid size-stabiliser was made as follows:

An aqueous dispersion of a polyacrylate acid and containing 38 wt % solids was obtained from Rohm and Haas under the trade name 'Primal' B85. The dispersion was diluted by adding 13.2 g of dispersion to 250 mls of water. 180 mls of the diluted dispersion was mixed with 720 mls of a colloidal dispersion of gold made according to Example 1. 25 mls of a flocculation modifier consisting of 1 g of 'Superfloc' 587 in 100 mls of water was added to the mixture. Spontaneous flocculation occurred and the floccular composition was filtered and dried.

EXAMPLE 21

This invention illustrates the use of polytetrafluoroethylene (PTFE) as a size-stabiliser and also the use of a pH-dependant flocculation modifier to delay the onset of flocculation. The PTFE was obtained as an aqueous dispersion from Farbwerke Hoechst under the trade name 'Hostaflon' TF 5032. The dispersion contained 60% by weight of solids comprising particles of PTFE (which is hydrophobic) having surfaces modified by the presence of some unidentified hydrophilic substance which might have been a polyethylene oxide. Before use the PTFE dispersion was diluted by adding 10 g of the dispersion to 250 mls of water. The pH-dependant flocculation modifier was an aqueous dispersion of a polyacrylic acid obtained from Rohm and Haas under the trade name 'Primal' Al. The dispersion was diluted by adding 20 g of dispersion to 250 mls of water. The floccular composition was made as follows.

400 mls of a colloidal dispersion of gold made according to Example 2 was mixed with 50 mls of the diluted PTFE dispersion. The mixture was stirred and then 1 ml of the diluted polyacrylic dispersion was added. Later, the pH of the mixture was adjusted to 2.5 or below by the addition of dilute sulphuric acid. Flocculation occurred spontaneously.

The floccular composition was filtered from the dispersant and dried. It was then cold-pressed (using a pressure of $1.5 \times 10^4$ MN/m$^2$) to form cold-sintered discs 1.5 mm thick. The discs were purple and translucent.

EXAMPLE 22

Floccular compositions containing copper were made as follows:

180 mls of the polystyrene size-stabiliser system used in Example 12 was added to 720 mls of the colloidal dispersion made according to Example 6. The combination was flocculated by adding 180 mls of the polyamine solution used in Example 12. The precipitate was pink but over a period of about 10 minutes it became green. However if it was dried quickly and converted to a film by the technique used in Examples 12 to 18 it was possible to obtain a pink film which indicates that the floccular composition has a high resistance to agglomeration of the ultrafine particles. The film colour too was unstable in air but the colour changed to a stable transparent green. It is not clear what compound of copper is created. It is presumed that attachment of the ultrafine particles to the size-stabiliser occurred for otherwise resistance to agglomeration would be low.

EXAMPLES 23 AND 24

The procedure of Example 22 was repeated using either for Example 23 a colloidal dispersion of cobalt made according to Example 7 or for Example 24 the colloidal dispersion of iron oxide made according to Example 8 instead of the dispersion of copper. Floccular compositions containing either transparent black ultrafine particles of cobalt or rusty red iron oxide were precipitated. The precipitates were converted to films which appeared to retain the colour of the precipitate illustrating that the floccular compositions have a high resistance to agglomeration of the ultrafine particles.

The colour of the precipitate containing cobalt was unstable in air and so conversion to the film had to be accomplished within 15 minutes of the formation of the precipitate. However the colour of the film was stable.

EXAMPLES 25 TO 27

These examples illustrate floccular compositions comprising three alternative pigments namely red cadmium sulpho-selenide (Example 25), yellow nickel titanate (Example 26) and blue cobalt aluminate (Example 27).

15 mls of a dispersion of pigment made according to Example 9 was added to 250 mls of water containing 50 g of the modified polystyrene latex used in Example 12. 3 mls of a dispersion of 5 g of 'Superfloc' 587 in 100 mls of water were added whereupon spontaneous flocculation occurred. The floccular composition was filtered from the dispersant, deposited thinly on a glass slide, dried and heated to 100° C. An intensely red film was obtained.

The procedure was repeated using in turn 15 mls of the dispersions of nickel titanate and cobalt aluminate made according to Examples 10 and 11 respectively. Intensely coloured yellow and blue films were obtained.

EXAMPLE 28

This Example illustrates a modified technique for use with very dense size-stabilisers in the form of large particles.

A suspension of barium sulphate (density 4.5 g/cm$^3$) was made by thoroughly mixing in a 5 liter beaker a solution of 197 g of barium acetate in 1 liter of water with a solution of 109.5 g of anhydrous sodium sulphate also in 1 liter of water. The barium sulphate obtained slowly settled out of the suspension. The barium sulphate was washed twice by adding fresh water, stirring to form a suspension, allowing the suspension to settle overnight and then decanting off the water. The particles of barium sulphate obtained had maximum dimensions in the range 40 to 120 nm.

A stable dispersion of barium sulphate in water was made by stirring the washed particles into 5 liters of water to form a suspension and then adding 12 g of a dispersion of a cationic polyelectrolyte flocculation modifier which inhibits settlement. The dispersion comprised 30 wt % of a quaterniary ammonium polyacrylate in aqueous isopropanol and was obtained from ABS Chemicals Ltd of Stockport, Cheshire. The polyacrylate is thought to have a molecular weight of 5000. The barium sulphate particles were recovered by filtration, washed by dispersing in fresh water and standing overnight before further filtration. Washing was repeated three times.

The washed particles were re-dispersed in water to produce a dispersion containing 16 wt % of solids. 18 g of this dispersion were added to 400 mls of a colloidal dispersion of silver prepared according to Example 3. The dispersions were stirred together whereupon spontaneous flocculation began producing a floccular composition comprising flocculation modifier attached to size-stabiliser in combination with ultrafine particles.

EXAMPLES 29 TO 31

Floccular compositions made according to Examples 12, 13 or 16 were mixed in turn into high density polyethylene (Example 29) polymethyl methacrylate (Example 30) or polystyrene (Example 31) as follows:

Each floccular composition was shaken with granules of a commercial injection moulding grade of high density polyethylene, with 'Diakon' polymethyl methacrylate or with polystyrene in the presence of tetrahydrofuran. The tetrahydrofuran rendered the granules sticky so that the floccular composition adhered to them. Excess tetrahydrofuran was then poured off. The granules and adhering composition were charged to the hopper of a conventional single screw extruder feeding a plaque-defining injection mould. The charges were injection moulded into plaques 3 mm thick.

On formation of the plastics plaques, the colour generated by the 15 nm gold particles became red, that generated by the 25 nm gold particles became maroon and that generated by the silver particles became golden yellow. These are useful colours. A single-screw extruder is a notoriously inefficient method for mixing pigments into plastics materials (especially) crystalline polyolefins) which may account for some shift in colour. More efficient mixers will probably produce better results.

EXAMPLES 32 AND 33

These examples illustrate the use of floccular compositions to make a paint material containing silver (Example 32) or a paint containing gold (Example 33).

1 g of a floccular composition containing silver and made according to Example 11 was dissolved in 10 mls of propyl acetate. An organo-sol was obtained which preserved the ultrafine nature of the silver particles. Using a spatula, the solution was stirred into a commercially available paint base of the type used in making paints for motor vehicles and comprising nitrocellulose dispersed in alkyl acetate. The paint was then applied paper to produce a coating 300 μm which dried to a golden yellow colour.

The procedure was repeated using a floccular composition containing gold and made according to Example 20. The dried coating obtained was magenta.

EXAMPLE 34

A colour printing ink material was made as follows:

A floccular composition containing gold and made according to Example 17 was ground using a mortar and pestle. 1.5 g of the ground composition was mixed with 25 g of a conventional nitrocellulose printing ink base in a bead mill to produce a coloured ink. The ink was applied thinly to paper where it dried to produce a coating having a colour describable as pinkish magenta.

EXAMPLE 35

The procedure of Example 34 was repeated using 1 g of an unground floccular composition containing silver and barium sulphate and made according to Example 28 instead of the 1.5 g of ground gold composition. The dried coating obtained was golden yellow.

EXAMPLES 36 AND 37

The examples illustrate the use of floccular compositions comprising gold and either silica (Example 36) or alumina (Example 37) as the size-stabiliser in enamel fluxes for decorating porcelain.

A floccular composition was made by taking 1 liter of a colloidal dispersion of gold made according to Example 1 and adding 12.5 mls of a 4 wt% aqueous dispersion of silica (of average particle size 50 nm) followed by 12.5 mls of a dispersion of 'Superfloc' 521 as used in Example 14. The floccular composition was recovered by filtration and dried.

The dried floccular composition was ground using a mortar and pestle and passed through a 105 μm sieve. 7 g of the sieved composition was ball milled with an aqueous slurry containing 42 g of a conventional commerically available enamel flux comprising a lead silicate glass. The mixture was dried at 100° C. and passed through a 75 μm sieve before further drying for 30 mins at 100° C. in a vacuum oven.

20 g of the vacuum dried mixture was roll milled with about 15 g of an organic transfer medium to enable the mixture to be screen printed. The mixture was screen printed onto porcelain and fired at 700 to 900° C. A smooth glass enamel film having a pinkish magenta colour was obtained indicating that the ultrafine nature of the gold particles had not been lost.

The procedure was repeated using a 4 wt% dispersion of alumina instead of silica and using 23.5 mls of a 1 wt% dispersion of polyacrylic acid instead of 'Superfloc' 521. A similar pinkish magenta glass enamel film was obtained.

EXAMPLE 38

This Example illustrates the ability of a floccular composition to adsorb dyes. Two dyes were tested, namely 'Alcovar' Black supplied by Williams (Hounslow) Ltd., and 'Trypan' Blue. Both dyes are described in the "Colour Index" published in 1971 by the Society of Dyers and Colourists of Bradford England and those descriptions are herein incorporated by reference. 'Alcovar' Black is listed as Solvent Black 33 and 'Trypan' blue is listed as Direct Blue 14, Colour Index number 23850.

An aqueous dispersion of 'Alcovar' Black was mixed with an aqueous suspension of a yellow floccular composition comprising silver on barium sulphate as made according to Example 28. The mixture was stirred and allowed to stand overnight. The dye was adsorbed by the floccular composition and it caused the colour of the composition to change from yellow to green.

By way of comparison, the procedure was repeated using a dispersion of barium sulphate alone instead of the floccular composition. The dye was not adsorbed and no colour change occurred.

The procedures were repeated using an aqueous dispersion of 'Trypan' Blue instead of 'Alcovar' Black. 'Trypan' Blue was adsorbed by the floccular composition causing a colour change from yellow to grey. It was not adsorbed by the barium sulphate alone and no colour change occurred.

Clearly dyeing offers the possibility of modifying the the colour of the floccular composition by adsorbtion of the dye onto either the ultrafine particles or onto the composition in general. Accordingly this invention also provides a floccular composition which additionally comprises adsorbed dye.

We claim:

1. A dry, free-flowing floccular composition comprising
   (a) ultrafine inorganic particles in which the maximum dimension of a major proportion of the particles is from 0.5 to 3000 nm,
   (b) a particulate size-stabiliser in combination with the particles, the size-stabiliser comprising a lyophobic core and a lyophilic surface and wherein the size-stabiliser is sufficiently impermeable to said liquid dispersant to prevent a reduction of more than 5% in the volume of the size-stabilizer on removal of the size-stabilizer from a dispersion of the size-stabilizer in said liquid dispersant and a flocculating agent which comprises a polyelectrolyte attached to the combination of size-stabiliser and ultrafine particles, the lyophobic/lyophilic size-stabiliser (b) functioning to resist agglomeration of the ultrafine particles during formation of the composition and during its mixing into viscous molten plastic materials which would normally cause agglomeration and the flocculating agent (c) functioning by attachment to particles (a) or a combination of (a) and (b), to cause flocculation of said particles with said size-stabiliser.

2. A floccular composition according to claim 1 wherein the ultrafine particles are transparent particles of one or more metals of the coinage and transition groups excluding metals more electropositive than cobalt.

3. A floccular composition according to claim 2 wherein the maximum dimension of a major proportion of the particles is from 2 to 50 nm.

4. A floccular composition according to claim 3 wherein less than 1% by number of the particles have a maximum dimension which differs from the number average maximum dimension of all particles by more than 40 nm.

5. A floccular composition according to claim 1 wherein the ultrafine metal particles are transparent particles of one or more metal compounds.

6. A floccular composition according to claim 5 wherein the maximum dimension of a major proportion of the particles is from 2 to 150 nm.

7. A floccular composition according to claim 1 wherein the size-stabiliser comprises a hydrophobic organic substance having a molecular weight of at least 5000.

8. A floccular composition according to claim 1 wherein the size-stabiliser comprises an inorganic compound.

9. A floccular composition according to claim 8 wherein the size-stabiliser has a density above 3.5 g/cm$^3$.

10. A floccular composition according to claim 1 wherein the molecular weight of the polectrolyte flocculating agent is at least 3000.

11. A free-flowing composition comprising ultrafine particles, a size-stabiliser in combination with the ultrafine particles and a flocculating agent attached to the combination of size-stabiliser and particles, the particles, size-stabiliser and flocculating agent being as defined in claim 1.

12. A method for making a free-flowing floccular composition comprising ultrafine inorganic particles in which the maximum dimension of a major proportion of the particles is from 0.5 to 3000 nm wherein the method comprises steps of
(a) adding a colloidal dispersion of ultrafine particles to a dispersion of a particulate size-stabiliser in liquid dispersant whereupon the ultrafine particles and the said size-stabiliser is sufficiently impermeable to the liquid dispersant to prevent a reduction of more than 5% in the volume of the size-stabilizer substance on removal of the size-stabilizer from the liquid dispersant,
(b) either, before the addition of the colloidal dispersion of ultrafine particles to the dispersion of size-stabiliser, treating the size-stabiliser with a dispersion of a polyelectrolyte flocculating agent which on the addition of the colloidal dispersion flocculates with the size-stabiliser and ultrafine particles producing a floccular composition comprising flocculating agent and size-stabiliser in combination with ultrafine particles or, after the addition of the colloidal dispersion of ultrafine particles to the dispersion of size-stabiliser, treating the size-stabiliser with a dispersion of a polyelectrolyte flocculating agent which flocculates with the size-stabiliser and the ultrafine particles producing a floccular composition comprising flocculating agent and size-stabiliser in combination with ultrafine particles.

13. A method according to claim 12 which additionally comprises the step of separating off dispersant from the floccular composition whereby there is obtained a dry floccular composition which flocculating agent is attached to size stabiliser in combination with ultrafine particles.

14. A method according to claim 12 wherein the colloidal dispersion of ultrafine particles is made by liberating metal from dissolved metal compound.

15. A floccular composition according to claim 1 wherein the composition also comprises adsorbed dye.

16. A floccular composition of claim 1 wherein the colloidal dispersion of ultrafine particles is treated with a sterically hindering protective colloid before treatment with the dispersion of size-stabiliser.

17. A plastics ink, paint or refractory material containing ultrafine inorganic particles as claimed any one of claims 1 to 10.

18. A floccular composition according to claim 16 in which the particles are particles of metal a majority of which have a maximum dimension of from 2 to 50 nm.

19. A floccular composition according to claim 16 in which the particles are particles, of metal compound, a majority of which particles have a maximum dimension of from 2 to 50 nm.

20. A dry free-flowing composition comprising
(a) ultrafine inorganic particles in which the maximum dimension of a major proportion of the particles is from 0.5 to 45 nm.
(b) a particulate size-stabiliser in combination with the particles said size-stabiliser comprising a hydrophobic core and a hydrophilic surface and being sufficiently impermeable to water to prevent a reduction of more than 5% in the volume of the size-stabilizer on drying, and
(c) a flocculating agent which comprises a polyelectrolyte attached to the combination of size-stabiliser and ultrafine particles.

21. A composition according to claim 20, wherein the particles (a) comprise gold or silver; the size-stabilizer is present as a dispersion in liquid disperant, the particle size of the stabilizer being in the range of 20 nm to 5 µm; and the flocculation modifier has a molecular weight of at least 10,000, said composition being characterized by a reduced tendency for the particles to agglomerate.

22. The composition of claim 21 wherein the size-stabilizer is silica.

23. A composition according to claim 1 wherein the particles (a) are metal particles; the size stabilizer (b) comprises silica or a polymer having a hydrophobic core and a hydrophilic surface and the flocculating agent (c) is a polyacrylamide, a polyamine or a salt of a polyacrylate.

24. A method according to claim 12 wherein the colloidal dispersion of ultrafine particles and dispersion of size-stabiliser are, respectively, an aqueous dispersion of metal particles and an aqueous dispersion of a material which has a hydrophobic core and a hydrophilic surface; and the dispersion of flocculating agent is an aqueous dispersion of a polyacrylamide, polyamine or salt of a polyacrylate.

* * * * *